(12) United States Patent
Akif et al.

(10) Patent No.: US 10,315,597 B2
(45) Date of Patent: Jun. 11, 2019

(54) DEFORMATION STRUCTURE, IN PARTICULAR FOR PEDESTRIAN PROTECTION FOR A MOTOR VEHICLE

(71) Applicant: Bayerische Motoren Werke Aktiengesellschaft, Munich (DE)

(72) Inventors: Oeztzan Akif, Munich (DE); Gerhard Fichtinger, Grasbrunn (DE); Wilhelm Riedl, Pfaffenhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/625,621

(22) Filed: Jun. 16, 2017

(65) Prior Publication Data

US 2017/0282825 A1   Oct. 5, 2017

Related U.S. Application Data

(63) Continuation of application No. PCT/EP2015/078930, filed on Dec. 8, 2015.

(30) Foreign Application Priority Data

Dec. 18, 2014 (DE) .................. 10 2014 226 363
Apr. 24, 2015 (DE) .................. 10 2015 207 610

(51) Int. Cl.
  *B60R 19/34* (2006.01)
  *B60R 19/18* (2006.01)
  (Continued)

(52) U.S. Cl.
  CPC ............ *B60R 19/34* (2013.01); *B60R 19/023* (2013.01); *B60R 19/18* (2013.01); *B60R 19/26* (2013.01);
  (Continued)

(58) Field of Classification Search
  CPC ....... B60R 19/34; B60R 19/023; B60R 19/18; B60R 16/26; B60R 19/28; B60R 19/30; B60R 21/34; B64C 1/062; F16F 7/125
  (Continued)

(56) References Cited

U.S. PATENT DOCUMENTS 3,899,047 A * 8/1975 Maeda ................. B60R 19/34
                                                             188/374
4,844,213 A   7/1989 Travis
(Continued)

FOREIGN PATENT DOCUMENTS

CN        2521093 Y    11/2002
CN      102173291 A     9/2011
(Continued)

OTHER PUBLICATIONS

German-language Search Report issued in counterpart German Application No. 10 2015 207 610.5 dated Nov. 11, 2015 with partial English translation (13 pages).

(Continued)

*Primary Examiner* — Joseph D. Pape
(74) *Attorney, Agent, or Firm* — Crowell & Moring LLP

(57) ABSTRACT

A deformation structure, which is an energy absorption structure, has a series of deformation elements arranged one behind the other in a deformation direction, i.e. the direction in which a load acts. Each two adjacent deformation elements are coupled together by a coupling mechanism, such that in a first load case, in particular a first collision load case, two adjacent deformation elements enter into a latching engagement with one another or are positioned in a latching engagement, such that a relative displacement of the adjacent deformation elements with respect to one another in the deformation direction is prevented, or at least made more difficult, and a deforming of the deformation (Continued)

structure occurs at a high level of force, and in a second load case, in particular a second collision load case, two adjacent deformation elements do not enter into the latching engagement or leave a latching engagement, such that a relative displacement of the adjacent deformation elements in the deformation direction is enabled, or at least made easier, and a deforming of the deformation structure occurs at a low level of force.

16 Claims, 3 Drawing Sheets

(51) Int. Cl.
    *B60R 19/28* (2006.01)
    *B60R 21/34* (2011.01)
    *F16F 7/12* (2006.01)
    *B60R 19/30* (2006.01)
    *B60R 19/02* (2006.01)
    *B60R 19/26* (2006.01)
    *B60R 19/00* (2006.01)

(52) U.S. Cl.
    CPC .............. *B60R 19/28* (2013.01); *B60R 19/30* (2013.01); *B60R 21/34* (2013.01); *F16F 7/125* (2013.01); *B60R 2019/007* (2013.01); *B60R 2019/186* (2013.01); *B60R 2019/262* (2013.01); *B60R 2019/268* (2013.01); *F16F 7/121* (2013.01)

(58) Field of Classification Search
    USPC .................................................. 293/132, 133
    See application file for complete search history.

(56) References Cited

U.S. PATENT DOCUMENTS

| 5,884,959 | A | * | 3/1999 | Hillen | ..................... B60R 19/36 |
| | | | | | 188/276 |
| 7,070,217 | B2 | * | 7/2006 | Longo | ..................... B60R 19/34 |
| | | | | | 293/132 |
| 2004/0222667 | A1 | | 11/2004 | Ericsson | |

FOREIGN PATENT DOCUMENTS

| CN | 103507734 A | 1/2014 |
| DE | 297 00 017 U1 | 2/1997 |
| DE | 19700022 A1 | 7/1998 |
| DE | 10 2004 059 545 A1 | 6/2006 |
| DE | 603 16 232 T2 | 6/2008 |
| DE | 10 2010 054 641 A1 | 6/2012 |
| DE | 10 2012 112 636 A1 | 7/2014 |
| EP | 2 266 846 A2 | 12/2010 |
| JP | 10-109605 A | 4/1998 |
| SU | 1574497 A1 | 6/1990 |
| WO | WO 02/18816 A1 | 3/2002 |

OTHER PUBLICATIONS

International Search Report (PCT/ISA/210) issued in PCT Application No. PCT/EP2015/078930 dated Feb. 9, 2016 with English translation (6 pages).
German-language Written Opinion (PCT/ISA/237) issued in PCT Application No. PCT/EP2015/078930 dated Feb. 9, 2016 (7 pages).
Chinese-language Office Action issued in counterpart Chinese Application No. 201580058836.X dated Nov. 30, 2018 with English translation (18 pages).

* cited by examiner

DEFORMATION STRUCTURE, IN PARTICULAR FOR PEDESTRIAN PROTECTION FOR A MOTOR VEHICLE

CROSS REFERENCE TO RELATED APPLICATIONS

This application is a continuation of PCT International Application No. PCT/EP2015/078930, filed Dec. 8, 2015, which claims priority under 35 U.S.C. § 119 from German Patent Application No. 10 2014 226 363.8, filed Dec. 18, 2014 and 10 2015 207 610.5, filed Apr. 24, 2015, the entire disclosures of which are herein expressly incorporated by reference.

This application contains subject matter related to U.S. application Ser. No. 15/625,646, entitled "Pedestrian Protection Device for a Motor Vehicle" filed on Jun. 16, 2017.

BACKGROUND AND SUMMARY OF THE INVENTION

The present invention relates to a deformation structure, in particular for a pedestrian protection for a motor vehicle. The deformation structure is adapted, for example, to be arranged between a bumper covering and a bumper transverse support.

A known front end of a motor vehicle, for example, has a bumper transverse support, which is fastened to forward ends of longitudinal supports, and a bumper covering. A soft foam, which can be deformed at a comparatively low load level, is arranged between the bumper covering and the bumper transverse support, for the protection of pedestrians. As a result of a pedestrian protection, the soft foam is arranged, as the circumstances require, for protecting a pedestrian from a direct collision with a hard rigid structure of the motor vehicle, for example, the bumper transverse support.

Furthermore, there is a requirement that, at a very low speed range of up to, for example, 4 km/h, in which pedestrian protection is not relevant because of the low speed, the motor vehicle will not be damaged in the event of a collision.

In addition, at a slightly higher speed, which still is also not relevant to pedestrian protection, there is the requirement that damage in the event of a collision be as minor as possible and that, for example, a radiator structure, which is situated in the front end region, not be damaged.

The various requirements partly conflict with one another and require a comparatively long vehicle overhang at the vehicle front and therefore have higher weight and a disadvantageous influence on the driving dynamics.

For solving the conflicting objectives arising therefrom, a bumper arrangement having a transverse support was suggested in German Patent document DE 102010054641 A1, which is fastened to the vehicle body by way of crash boxes. A pedestrian protection element for a soft impact of a pedestrian is constructed in the driving direction in front of the transverse support. In addition, a swivelable energy absorption element is provided, which can be swiveled in front of the pedestrian protection element and thereby permits an increased energy absorption in the event of collisions in which a higher collision energy absorption capacity of the crash structure of the motor vehicle is required.

German Patent document DE 102012112636 A1 also shows a bumper arrangement having a bumper transverse support and a pedestrian protection element, which can be switched by way of an actuator from a rigid state to a comparatively soft state, which serves a pedestrian protection.

German Patent documents DE 102010054641 A1 and DE 102012112636 A1 have in common that a crash or pre-crash sensor system is required, in which case, on the basis of the output signals of the sensor system, a switching-over can take place between a hard rigid state of the crash structure with a high collision energy absorption capacity and a soft state of the crash structure with a lower collision absorption capacity for the benefit of pedestrian protection.

It is therefore an object of the present invention to create a deformation structure, particularly for the pedestrian protection for a motor vehicle, which is adapted, for example, for arrangement between a bumper covering and a bumper transverse support, and which, as a function of a load event, can be deformed at different energy levels, has a simple construction and functions independently of a sensor system and an actuator respectively.

This and other objects are achieved by a deformation structure in accordance with embodiments of the invention.

A deformation structure, which may also be called an energy absorption structure, has a row of deformation elements arranged in a deformation direction, i.e. the direction of a load action, behind one another. In each case, two mutually adjoining deformation elements are mutually coupled by a coupling mechanism such that, in a first load event, particularly a first collision load event, two adjoining deformation elements will enter into a mutually latching engagement or are in a latching engagement, so that a relative displacement of the adjoining deformation elements with respect to one another in the deformation direction is prevented or at least made more difficult and a deforming of the deformation structure takes place at a high force level. And, in a second load event, particularly a second collision load event, two adjoining deformation elements do not enter into the latching engagement or leave the latching engagement, so that a relative displacement of the adjoining deformation elements in the deformation direction is made possible or at least facilitated, and a deforming of the deformation structure takes place at a low force level.

As a result of the deformation structure according to the invention, no collision sensor system and no actuator system are required in order to possibly actively lock or unlock a mechanical mechanism and thereby to be able to change over, as required, between a structure with a "soft" deformation behavior and a "rigid" deformation behavior. The deformation structure can thereby achieve the above-mentioned object by use of simple devices, while utilizing a latching engagement of the coupling mechanism which, as a function of a load event, engages or does not engage or remains in the engaged condition or moves out of this engaged condition, between adjoining deformation elements. In this case, the coupling mechanism utilizes a mass inertia of the latching elements for the latching engagement, which mass inertia leads or does not lead to a latching engagement at different deformation speeds, thus a speed of a displacement of two adjoining deformation elements with respect to one another.

The deformation structure is designed and can be used, for example, for the pedestrian protection for a motor vehicle. In particular, the deformation structure may be adapted for the arrangement in a region between a bumper covering, which forms a vehicle skin, and a bumper transverse support.

In particular, the deformation direction is a collision direction and, when used for the pedestrian protection in the motor vehicle front or the motor vehicle rear, is a longitudinal direction of the vehicle. A relative displacement between adjoining deformation elements takes place essentially in the longitudinal direction of the motor vehicle, which normally also is a main direction in the case of a frontal collision of the motor vehicle. In this case, the coupling mechanism according to the present invention acts independently of a collision sensor system autonomously, for example, by a utilization of the mass inertia of the latching engagement.

However, basically, the protection range of the deformation structure according to the invention also extends to all other application ranges in the motor vehicle field or other fields of technology, in which a deformability of a deformation structure is required at different load levels as a function of a load event.

According to a preferred further development of the deformation structure, each deformation element, as a component of the coupling mechanism, has an elastically deformable element. The elastically deformable element engages with the adjoining deformation element and, in the first load event, is in the latching engagement with the adjoining deformation element, or enters into the latching engagement with the adjoining deformation element and, in the second load event, does not enter into the latching engagement with the adjoining deformation element or leaves the latching engagement of the adjoining deformation element.

The deformation element may also have more than one elastically deformable element, for example two, three or four or more elastically deformable elements.

In the case of the deformation structure having the elastic element, the coupling mechanism may preferably be designed such that the elastically deformable element can be elastically deformed and thereby prestressed by a relative displacement of two adjoining deformation elements.

This has the advantage that a prestressing of the elastically deformable element does not take place before the load event and, in a normal condition, the deformable element is relaxed, and thereby the function of the deformation structure can be better ensured for a long period of time. A loss of a prestressing force over the long time period is thereby avoided.

As an alternative, the elastically deformable element can already be prestressed in the normal condition without a load event.

This has the advantage that no relative displacement between the deformation elements is required for the prestressing, and the deformation structure may possibly have a shorter construction.

Furthermore, the coupling mechanism may, in particular, be designed such that, while utilizing a mass inertia of the prestressed elastically deformable element, at a first, for example, lower displacement speed, the elastically deformable element of the one deformation element enters into an indentation of the other deformation element in the latching engagement, and the elastically deformable element, at a second, for example, higher displacement speed, does not enter into the latching engagement with the indentation. As an alternative, the elastically deformable element may also engage with a projection of the adjoining deformation element. An automatic mechanism is thereby created, which utilizes a mass inertia of the elastically deformable element for its function. As a result, an engagement takes place at a low displacement speed and therefore a low collision speed, and the deformation element therefore acts in a rigid manner. At the fast displacement speed and therefore the fast collision speed, the elastically deformable element does not engage, and a further displacement becomes possible between the adjoining deformation elements, whereby the deformation structure as a whole reacts in a soft manner.

The latching engagement can therefore establish a form-locking connection between the adjoining deformation elements, so that a relative displacement between the adjoining deformation elements is no longer possible, and the adjoining deformation elements therefore have a "rigid" behavior.

According to a preferred embodiment, the elastically deformable element of a deformation element can be designed to be interacting with an adjoining deformation element such that, with a displacement of the adjoining deformation elements with respect to one another, the elastically deformable element can be elastically deformed and prestressed, for example, by way of a slanting contact surface of the adjoining deformation element.

As a result, it becomes possible to generate the prestressing of the elastically deformable element during the load event. In other words, for example, a collision load can be utilized for a prestressing of the elastically deformable element.

The elastically deformable element may be a leg whose forward, for example, free end has a detent projection or a detent indentation for a latching engagement with the adjoining deformation element, and whose rearward end, similar to a cantilever, is fixedly clamped in, so that the forward end with the detent can have a spring effect. The leg may have a flat, thus a leaf-shaped construction and can therefore act like a leaf spring. During the rapid displacement, the detent or detent indentation slides particularly over and beyond the counterpart of the adjoining deformation element, and a further displacement between the adjoining deformation elements is made possible, whereby the deformation structure as a whole reacts in a soft manner.

The deformation elements may essentially be designed in a U-shape with a base element and two opposite legs, which each form the elastic element, wherein ends with, for example, a detent or detent indentation of the legs are coupled with the base element of a further deformation element.

In particular, the two legs may be arranged symmetrically with respect to one another. Furthermore, the two legs may be deformable or prestressable in opposite directions.

According to an advantageous further development, in the case of a deformation structure of the present invention, each deformation element may be constructed in one piece.

As a result, the production of the deformation elements and of the deformation structure is simplified, and the number of components is small.

According to a further advantageous development, the deformation elements may be constructed of a plastic material.

A plastic material has a light weight, can be produced in a cost-effective manner and, in a particularly simple fashion, can be used for constructing a coupling mechanism having a latching engagement.

According to a further development of the deformation structure, a plurality of rows of deformation elements are arranged side-by-side.

The term "side-by-side" particularly means adjacent to one another and also includes the "above-one-another" arrangement.

When applied to the case of the pedestrian protection in a motor vehicle, this means that the rows of deformation elements may be arranged side-by-side in the y- and/or z-direction. In particular, the deformation structure with the plurality of rows of deformation elements may essentially fill a space between the bumper covering and the bumper transverse support relevant to a pedestrian protection. In the case of a local stressing of the deformation structure, a corresponding local deforming of the deformation structure may take place.

Particularly when used for the pedestrian protection of a motor vehicle, a row of deformation elements may, for example, be constructed of three to fifteen, for example, ten deformation elements arranged behind one another. Depending on the installation space and the use case, rows that are arranged side-by-side may have a different number of deformation elements.

According to a further development of the deformation structure with several adjacent rows of deformation elements, deformation elements that are arranged directly side-by-side may be mutually connected by means of a web.

The deformation structure can thereby form an integral modular unit, which can easily be handled, for example, mounted. Furthermore, such a deformation structure can, for example, easily be produced as a component by so-called rapid prototyping or rapid manufacturing, for example, laser sintering or stereo-lithography.

In particular, the web may be constructed such that, in the collision load event, it will fail in a brittle and/or plastic manner. Specifically, the web will fail without impairing a function of the mutually adjoining deformation elements.

The web therefore does not have any effect on a function of the deformation structure and particularly of the coupling mechanism.

According to a preferred further development of the deformation structure, the deformation elements are adapted such that, in a latching engagement state, i.e. in the first load event, in which the deformation structure is more rigid, they absorb energy by plastic deformation and/or brittle failure of the deformation elements over a predefined deformation distance.

Preferably, an energy absorption capacity of the deformation elements, which are in a latching engagement or remain in the latching engagement, is greater than an energy absorption capacity of the deformation elements which do not enter in the latching engagement or leave the latching engagement.

According to a further development of the deformation structure, the deformation elements may have identical constructions.

According to a preferred further development, in the use case of the deformation structure as a pedestrian protection in the motor vehicle, below a collision speed threshold value, the row of deformation elements reacts in a more rigid manner as a result of the latching of adjoining deformation elements and, when the collision speed threshold value is reached, reacts in a softer manner as a result of the release or the absence of the latching.

The structure of the front end or of the rear end of the motor vehicle can therefore be constructed to be sufficiently rigid for a relatively low speed, so that no structural damage, for example, of the bumper covering or the like will occur as a result of excessive deforming. Repair costs can thereby be minimized in the event of collisions at a very low speed, for example, in the case of so-called trivial damage when parking and can be limited merely to the touching-up, for example, of paint damage.

Above the collision speed threshold value that is relevant to a pedestrian protection, no latching of adjoining deformation elements takes place, and the row of deformation elements can be changed in its length at a relatively low force for the protection of pedestrians, i.e. can be pushed together by the relative displacement of the adjoining deformation elements with respect to one another.

Depending on the collision load and therefore the speed during the collision, the deformation structure can therefore react completely rigidly and transmit the collision load to the crash structure of the vehicle situated behind it, or a load threshold value of the latched deformation elements is exceeded and the row of deformation elements fails as a result of brittle fracture or plastic deforming and can therefore absorb collision energy for the protection of other components and of the vehicle occupants.

In the use case of the deformation structure as pedestrian protection in the motor vehicle, a row of deformation elements may have a length of from 50 to 150 mm. The row of deformation elements may preferably have a length of between 70 and 110 mm. In the second load event, the row of deformation elements may preferably be deformable at a low force level by 60 to 110 mm.

The above-mentioned further developments of the invention may be arbitrarily combined with one another to the extent possible and meaningful.

Other objects, advantages and novel features of the present invention will become apparent from the following detailed description of one or more preferred embodiments when considered in conjunction with the accompanying drawings.

DETAILED DESCRIPTION OF THE DRAWINGS

In the following, embodiments of the present invention will be described with reference to FIGS. 1, 2 3A to 3G and 4A to 4G.

Figure 1:
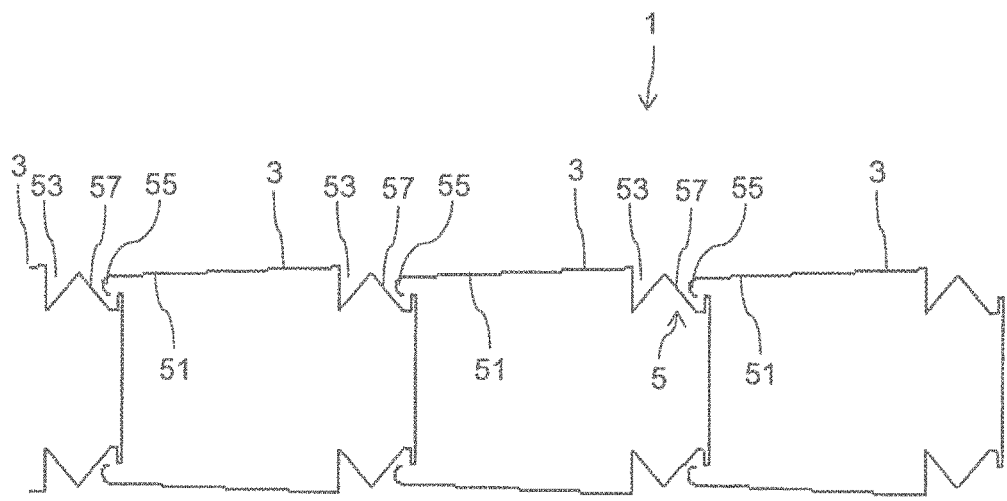
FIG. 1 is a schematic lateral view of a section of a deformation structure for pedestrian protection for a motor vehicle according to an embodiment of the present invention.

FIG. 1 illustrates a basic section of a deformation structure 1 according to an embodiment of the present invention. According to the embodiment, the deformation structure 1 is mounted on a front end of a motor vehicle, particularly in front of a bumper transverse support, which is not shown, instead of a known pedestrian protection foam. In particular, the deformation structure 1 is arranged in a space between a vehicle skin, i.e. a bumper covering, and the bumper transverse support.

As illustrated in FIG. 1, the deformation structure 1 has a row of deformation elements 3 arranged one behind the other. The deformation elements 3 are mutually coupled by way of a coupling mechanism 5. Each deformation element 3 has an essentially U-shaped construction consisting of a basic element on which two leaf-shaped legs 51 are arranged which can be elastically deformed toward the outside. The two opposite legs 51 extend essentially in the longitudinal direction of the vehicle, in which case the following explanation will only relate to one leg 51, and in which case the other leg 51 is constructed symmetrically thereto. A forward end of the leg 51 borders on the basic element of the adjoining deformation element 3 and has a detent 55, which, as required, engages with the adjoining basic element. The basic element has a slanted contact surface 57, behind which a detent indentation 53 is constructed. The contact surface 57 has a slope in the longitudinal direction of the vehicle.

Figure 2:
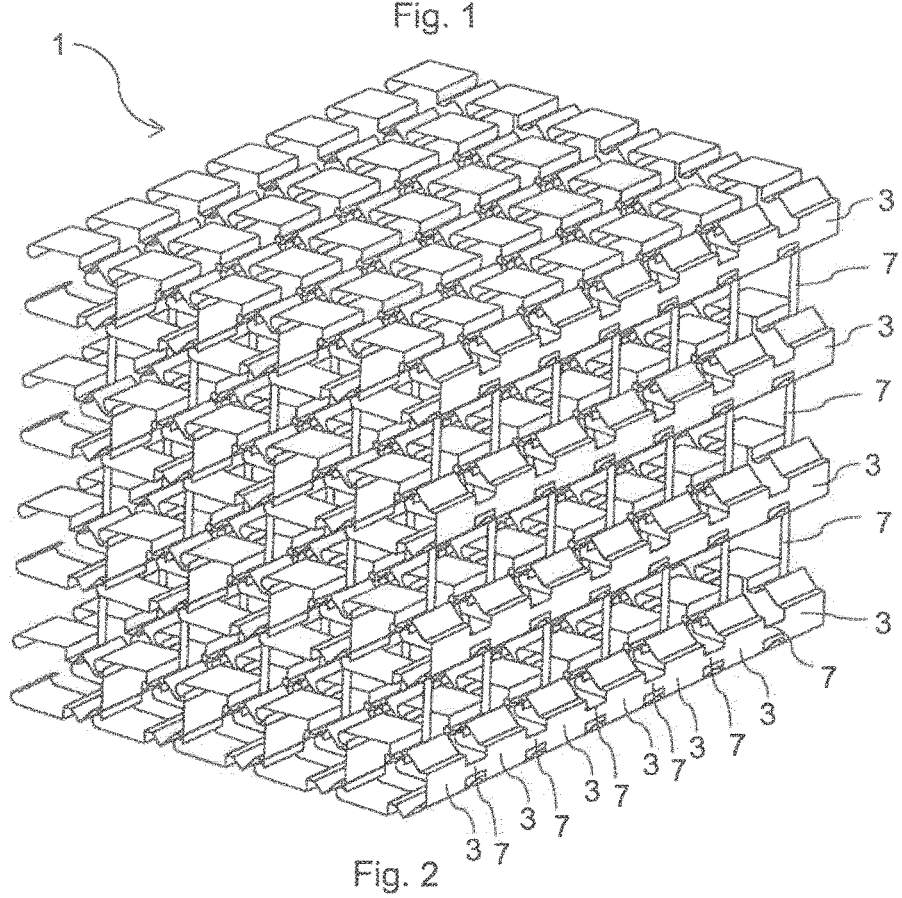
FIG. 2 is a schematic perspective view of the deformation structure according to the embodiment of the present invention.

FIG. 2 is a perspective view of the deformation structure 1. The deformation structure 1 has several rows of deformation elements 3 arranged side-by-side, i.e. in the y-direction of the motor vehicle, and above one another, i.e. in the z-direction of the motor vehicle. Deformation elements arranged side-by-side and above one another are mutually connected by way of thin webs 7. As a result of the webs 7, the rows of deformation elements 3 are mutually connected and the deformation structure 1 forms an integral modular unit. The number of rows of deformation elements 3 and the number of the deformation elements 3 in each row can be selected according to the requirements.

The deformation structure 1 is preferably produced of a plastic material, whereby the deformation structure can be produced in a cost-effective manner and can be constructed to be of a sufficiently light weight. In particular, the deformation structure 1 can be produced in one piece by way of a rapid manufacturing process. As an alternative, the deformation elements 3 may be produced separately and be combined with one another and connected via a suitable automated mounting process.

In the following, a function of the deformation structure 1 will be described with reference to FIG. 1 and FIG. 2 as well as FIGS. 3A to 3G and FIGS. 4A to 4G.

In the case in which a load is applied in the longitudinal direction of the row of deformation elements 3 as a result of a collision—in FIG. 1 from the right side—the forward end of the leg 51 is pressed via the detent 55 against the slanted contact surface 57. As soon as a frictional force between the detent 55 and the contact surface 57 has been overcome, the detent 55 will slide along the contact surface 57, whereby the leg 51 is elastically deformed toward the outside, while the deformation element 3 is displaced by the collision load in the direction of the adjoining deformation element 3. As a result, the leg 51 is successively prestressed until it reaches the end of the contact surface.

The further course of the displacement of the adjoining deformation elements 3 with respect to one another depends on the respective collision load event. In FIGS. 3A to 3G, the pedestrian protection load event is indicated to be equal to or above a predefined collision speed of 20 km/h. In FIGS. 4A to 4G, the low speed load event is indicated to be below the predefined collision speed of 20 km/h. The specified collision speed is only mentioned here as an example and may also have a different value.

With reference to FIGS. 3A to 3G, a function of the deformation structure 1 is first described in the event of a collision of the motor vehicle at a collision speed of approximately 20 km/h and more.

Figure 3A:
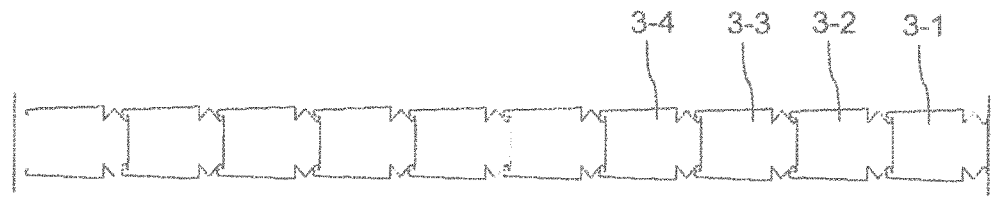
FIGS. 3A to 3G are schematic lateral views of the deformation structure according to the embodiment of the present invention in a collision load event at a higher speed.
Figure 3B:
Figure 3C:
Figure 3D:
Figure 3E:
Figure 3F:
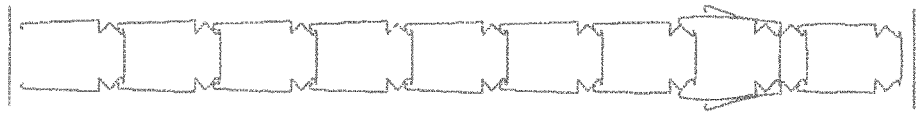
Figure 3G:

FIG. 3A illustrates the condition before the start of the deforming of the deformation structure 1. FIG. 3B finally shows an initial elastic deforming of the legs 51 of the first deformation element 3-1 and of the second deformation element 3-2. FIG. 3C illustrates how the detents 55 of the legs 51 of the second deformation element 3-2 start to slide along the slanted contact surfaces 57 of the third deformation element 3-3 and are thereby elastically prestressed. FIG. 3D shows how the detents 55 of the legs 51 of the second deformation element 3-2, as a result of a fast displacement speed and its mass inertia, slide over and beyond the indentations 53 of the third deformation element 3-3 without penetrating into the indentations 53 or engaging with the latter. FIG. 3E illustrates how the second deformation element 3-2 is therefore pushed further in the direction of the third deformation element 3-3, wherein the legs 51, as required, are correspondingly further elastically deformed, wherein, however, this elastic deforming takes place at a comparatively low force level. FIG. 3F finally shows how the second deformation element 3-2 was pushed completely against the third deformation element 3-3, and the two basic elements essentially adjoin one another, wherein the collision load acts in an intensified manner upon the third deformation element 3-3, whose detents 55 of the legs 51 finally slide along the contact surfaces 57 of the fourth deformation element 3-4, and the legs 51 of the third deformation element 3-3 are thereby elastically prestressed. FIG. 3G then shows how also the detents 55 of the legs 51 of the third deformation element 3-3 do not engage in the indentations 53 of the fourth deformation element 3-4, and the third deformation element 3-3 at a low force level is displaced further in the direction of the fourth deformation element 3-4. Depending on the course of the collision load, all deformation elements 3 can therefore successively be pushed into one another for the benefit of a pedestrian protection at a lower force level.

Starting at the collision speed of approximately 20 km/h, it is important that the front end of the motor vehicle front, and particularly the bumper covering in connection with the deformation structure 1 reacts sufficiently softly at a low deformation force level for the protection of a pedestrian. If the collision opponent is a pedestrian, at a speed of approximately 20 km/h and more, a relatively low force therefore acts upon the pedestrian.

According to the invention, this is implemented by the described coupling mechanism 5 which, on the basis of a mass inertia of the legs 51, functions in an interaction with their elastic prestressing in the course of the collision.

With reference to FIGS. 4A to 4G, a function of the deformation structure 1 during a collision of the motor vehicle at a collision speed of less than approximately 20 km/h will be described in the following.

Figure 4A:
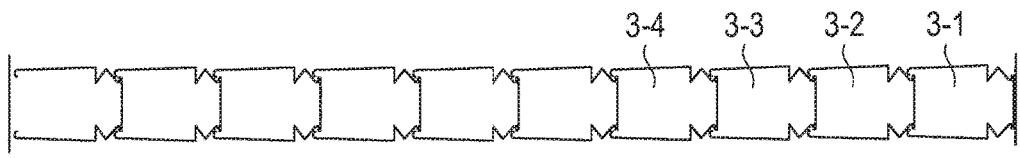
FIGS. 4A to 4G are schematic lateral views of the deformation structure according to the embodiment of the present invention in a collision load event at a lower speed.
Figure 4B:
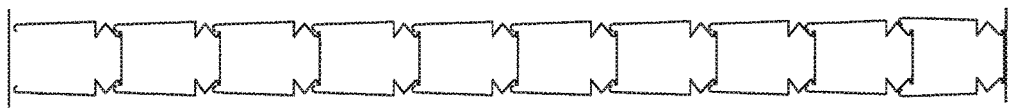

FIG. 4A illustrates the condition before the start of the deforming of the deformation structure 1. FIG. 4B finally shows an initial elastic deforming of the legs 51 of the first deformation element 3-1 and a sliding of the detents 55 on the contact surfaces 57 of the second deformation element 3-2.

Figure 4C:
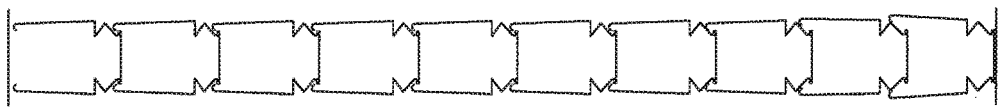
Figure 4D:
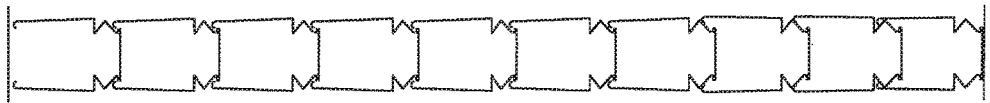
Figure 4E:
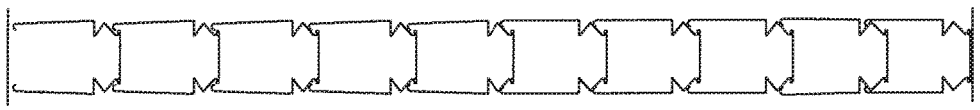
Figure 4F:
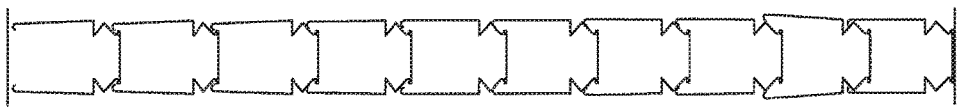
Figure 4G:
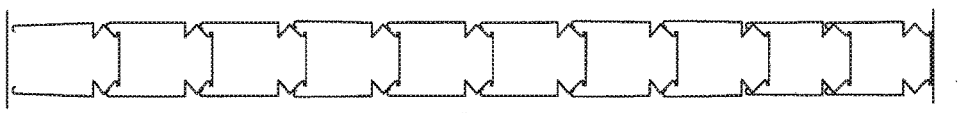

FIG. 4C shows how the detents 55 of the first deformation element 3-1 have reached a maximal prestressing and have arrived at the end of the contact surfaces 57. In FIG. 4D, it is illustrated how the detents 55 of the first deformation element 3-1, as a result of the slow displacement speed and its elastic prestressing, engage in the indentations 53. As a result, a further displacement of the deformation element 3-1 with respect to the deformation element 3-2 is blocked in a form-locking manner. FIG. 4E illustrates how the detents 55 of the second deformation element 3-2 slide along the contact surfaces 57 of the third deformation element 3-3, and the legs 51 of the second deformation element 3-2 are thereby elastically deformed. FIG. 4F shows how a prestressing of the legs 51 of the second deformation element 3-2 reaches a maximum, and the detents 55 have arrived at the end of the contact surfaces 57, and the detents 55 of the leg 51 of the third deformation element 3-3 are already sliding along the contact surfaces 57 of the fourth deformation element 3-4. FIG. 4G illustrates how also the detents 55 of the legs 51 of the second deformation element 3-2 engage in the indentations 53 of the third deformation element 3-3, whereby therefore a further displacement of the second deformation element 3-2 with respect to the third deformation element 3-3 is blocked in a form-locking manner, and the detents 55 of the legs 51 of the third deformation element 3-3 have already arrived at the end of the contact surfaces 57 of the fourth deformation element 3-4 and have reached a maximal prestressing. Depending on the course of the collision load, all deformation elements 3 can therefore form-lockingly engage with one another, so that, on the whole, as a result of the slow collision speed of the motor vehicle and the thereby caused slow displacement speed of the deformation elements 3 relative to one another, the deformation structure 1 has a more rigid effect than in the case of the faster collision speed at which a form-locking engagement of the deformation elements 3 does not take place.

Therefore, in the case of the slow collision speed, depending on the collision load level, the deformation structure 1 transmits the collision load directly to a structure of the motor vehicle situated behind it, or the individual deformation elements 3 of the deformation structure 1 fail in a brittle manner by breaking and/or failing by plasticly deforming at a higher load level than at the faster collision speed.

In particular, the deformation structure 1 may be designed such that, at collision speeds of, for example, less than 4 km/h, it can transmit a collision load to the crash structure without any failing of the deformation elements 3. This is advantageous when, in the case of so-called trivial damage when parking a car, or the like, there is to be no damage at the motor vehicle requiring repair, and it influences, for example, an insurance-related classification of the motor vehicle.

At a higher collision speed which, however, is not yet relevant in terms of pedestrian protection, for example, a speed of between 4 km/h and 20 km/h, the deformation structure 1 may be plastically deformed at a specified load level and/or fail in a brittle manner, so that the deformation structure 1 contributes to the reduction of collision energy, without any damage, for example, to structural elements situated, for example, behind the bumper transverse support, such as a radiator. In this case, only the comparatively cost-efficient deformation structure 1 and, as required, the bumper covering, has to be replaced.

On the whole, by use of the deformation structure 1 according to the invention, a conflict of objectives can be solved, which, on the one hand, at very low collision speeds, which are not relevant in terms of pedestrian protection, permits a sufficiently high rigidity of the structure or a sufficiently large deforming force level of the deformation structure 1 and, at a slightly higher collision speed, which is relevant in terms of pedestrian protection, ensures sufficient pedestrian protection by means of a low deforming force level.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A deformation structure for a motor vehicle arranged between a bumper covering and a bumper transverse support, comprising:
   a row of deformation elements arranged one behind the other in a deformation direction, wherein
   in each case, two mutually adjoining deformation elements in the row of deformation elements are mutually coupled via a coupling mechanism such that:
   (i) in a first load event, the two mutually adjoining deformation elements will enter into a mutual latching engagement or are in a latching engagement, so that a relative displacement of the two mutually adjoining deformation elements with respect to one another in the deformation direction is prevented or at least made more difficult and a deforming of the deformation structure takes place at a high force level, and
   (ii) in a second load event, the two mutually adjoining deformation elements do not enter into the latching engagement or leave the latching engagement, so that a relative displacement of the two mutually adjoining deformation elements in the deformation direction is made possible or at least facilitated, and a deforming of the deformation structure takes place at a low force level.

2. The deformation structure according to claim 1, wherein
   each of the two mutually adjoining deformation elements, as a component of the coupling mechanism, has an elastically deformable element, which engages with an adjoining deformation element and, in the first load event, is in the latching engagement with the adjoining deformation element, or enters into the latching engagement with the adjoining deformation element and, in the second load event, does not enter into the latching engagement with the adjoining deformation element or leaves the latching engagement of the adjoining deformation element.

3. The deformation structure according to claim 2, wherein
   the coupling mechanism is designed such that the elastically deformable element is elastically prestressed or is elastically prestressable by a relative displacement of the two mutually adjoining deformation elements, and
   the coupling mechanism is designed such that, while utilizing a mass inertia of the prestressed elastically deformable element, at a first displacement speed, the elastically deformable element of one of the two mutually adjoining deformation elements enters in the latching engagement with an indentation or a projection of the other of the two mutually adjoining deformation elements, and the elastically deformable element, at a second higher displacement speed, does not enter into the latching engagement with the indentation or the projection.

4. The deformation structure according to claim 3, wherein the first displacement speed is lower than the second displacement speed.

5. The deformation structure according to claim 2, wherein
   the elastically deformable element of one of the two mutually adjoining deformation elements is designed to interact with the other of the two mutually adjoining deformation elements such that, with a displacement of the two mutually adjoining deformation elements with respect to one another, the elastically deformable element is elastically deformable and prestressable by way of a slanted contact surface of the other of the two mutually adjoining deformation elements.

6. The deformation structure according to claim 3, wherein
   the elastically deformable element of one of the two mutually adjoining deformation elements is designed to interact with the other of the two mutually adjoining deformation elements such that, with a displacement of the two mutually adjoining deformation elements with respect to one another, the elastically deformable element is elastically deformable and prestressable by way of a slanted contact surface of the other of the two mutually adjoining deformation elements.

7. The deformation structure according to claim 2, wherein the elastically deformable element is a leaf-shaped leg, whose forward end has a detent or a detent indentation for a latching engagement with an adjoining deformation element.

8. The deformation structure according to claim 6, wherein the elastically deformable element is a leaf-shaped leg, whose forward end has a detent or a detent indentation for a latching engagement with an adjoining deformation element.

9. The deformation structure according to claim 7, wherein each deformation element in constructed to be U-shaped with a basic element and two opposite legs, which each form the elastically deformable element, and rearward ends of the legs are coupled with the basic element of an adjoining deformation element.

10. The deformation structure according to claim 1, wherein each deformation element in the row is constructed in one piece, and the deformation elements in the row are made of a plastic material.

11. The deformation structure according to claim 1, wherein a plurality of rows of deformation elements are arranged side-by-side.

12. The deformation structure according to claim 11, wherein deformation elements in the rows arranged directly side-by-side are mutually connected via a web which is constructed so as to fail in a brittle and/or plastic manner in an event of a collision load.

13. The deformation structure according to claim 1, wherein the deformation elements in the row are adapted to absorb, in the latching engagement state, energy by plastic deforming and/or brittle failure of each deformation element along a specified deformation distance.

14. The deformation structure according to claim 13, wherein an energy absorption capacity of the deformation elements in the row, which are in a latching engagement or remain in the latching engagement, is greater than an energy absorption capacity of the deformation elements in the row which do not enter in the latching engagement or leave the latching engagement.

15. The deformation structure according to claim 1, wherein the deformation elements in the row have identical constructions.

16. The deformation structure according to claim 1, wherein the deformation structure is configured as a pedestrian protection structure between the bumper covering and the bumper transverse support.

* * * * *